United States Patent [19]
Aikens

[11] Patent Number: 5,219,217
[45] Date of Patent: * Jun. 15, 1993

[54] ILLUMINATING SYSTEM

[75] Inventor: Wallace R. Aikens, Plano, Tex.

[73] Assignee: Gulton Industries, Inc., Plano, Tex.

[*] Notice: The portion of the term of this patent subsequent to May 14, 2008 has been disclaimed.

[21] Appl. No.: 697,306

[22] Filed: May 8, 1991

Related U.S. Application Data

[63] Continuation-in-part of Ser. No. 395,889, Aug. 18, 1989, Pat. No. 5,016,143, which is a continuation-in-part of Ser. No. 255,062, Oct. 7, 1988, Pat. No. 4,996,632.

[51] Int. Cl.⁵ .............................................. F21V 5/00
[52] U.S. Cl. ...................................... 362/32; 362/74; 362/293; 362/287; 362/812; 362/427; 40/546
[58] Field of Search ............... 362/31, 32, 293, 319, 362/340, 247, 812, 23, 26, 27, 30, 235, 242, 243, 372, 427, 277, 282, 284, 322, 324, 74, 151; 40/546, 547, 581, 431; 350/167, 286, 96.10, 311

[56] References Cited

U.S. PATENT DOCUMENTS

| | | | |
|---|---|---|---|
| 569,764 | 10/1896 | Nason | 40/431 |
| 1,615,449 | 1/1927 | Fullerton | 40/546 |
| 1,741,748 | 12/1929 | White | 40/546 |
| 1,837,091 | 12/1931 | Adams | 362/301 |
| 2,018,732 | 10/1935 | May | 362/32 |
| 2,041,909 | 5/1936 | Emmert et al. | 40/427 |
| 2,374,640 | 4/1945 | Paul | 40/431 |
| 2,493,829 | 1/1950 | Paul | 40/431 |
| 2,520,028 | 8/1950 | Biskind | 362/23 |
| 2,567,403 | 9/1951 | Rockola | 40/431 |
| 2,587,807 | 3/1952 | Arenberg et al. | 362/74 |
| 2,795,069 | 6/1957 | Hardesty | 40/546 |
| 2,831,283 | 4/1958 | Bone | 40/581 |
| 3,035,161 | 5/1962 | Kalt | 362/74 |
| 3,302,012 | 1/1967 | Reppisch | 362/32 |
| 3,399,476 | 9/1968 | Davis | 40/546 |
| 3,486,261 | 12/1969 | Hardesty | 40/546 |
| 4,260,220 | 4/1981 | Whitehead | 362/32 |
| 4,387,415 | 6/1983 | Domas | 362/74 |
| 4,525,772 | 6/1985 | Peck | 362/293 |
| 4,558,401 | 12/1985 | Tysoe | 362/29 |
| 4,561,043 | 12/1985 | Thompson | 362/32 |
| 4,750,798 | 6/1988 | Whitehead | 362/32 |
| 4,805,984 | 2/1989 | Cobb, Jr. | 350/96.28 |
| 4,947,293 | 8/1990 | Johnson | 362/32 |
| 4,996,632 | 2/1991 | Aikens | 362/32 |
| 5,006,966 | 4/1991 | Mikalonis | 362/74 |
| 5,016,143 | 5/1991 | Aikens | 362/32 |
| 5,113,322 | 5/1992 | Mikalonis | 362/74 |

FOREIGN PATENT DOCUMENTS

| | | |
|---|---|---|
| 2645311 | 4/1978 | Fed. Rep. of Germany . |
| 8606421 | 5/1986 | Fed. Rep. of Germany . |
| 688289 | 8/1930 | France . |
| 2591717 | 6/1987 | France . |

Primary Examiner—James C. Yeung
Attorney, Agent, or Firm—Darby & Darby

[57] ABSTRACT

An arrangement and method for providing an elongated light source, such as for illuminating a sign or the interior of a mass transit vehicle or other display, which includes emitting light from a light source into an elongated tubular member having a portion lined with a high reflectance film formed with longitudinal prismatic lenses, the tubular member having a light-transmissive opening along its length, with a diffusing medium substantially diametrically opposite such opening, and optionally a reflector or a second light source at one end of the tubular member. The emitted light propagates in the inner tubular member by reflecting from the high reflectance lining and the reflector to impinge on the diffusing medium and thereby transmit light outwardly through the light-transmissive opening so as to project light against a sign or advertising card or like object. Several units may be placed end-to-end to provide a longer illuminating arrangement. A single light source may be used to illuminate two adjoining units.

26 Claims, 6 Drawing Sheets

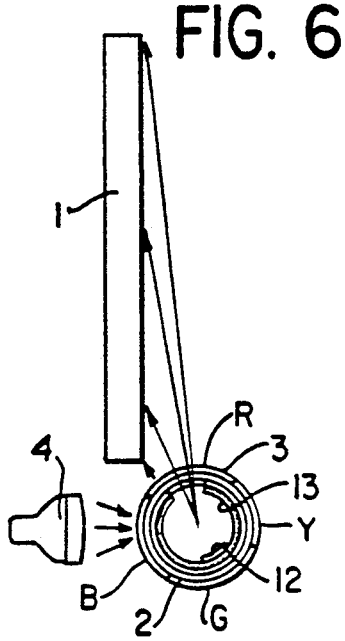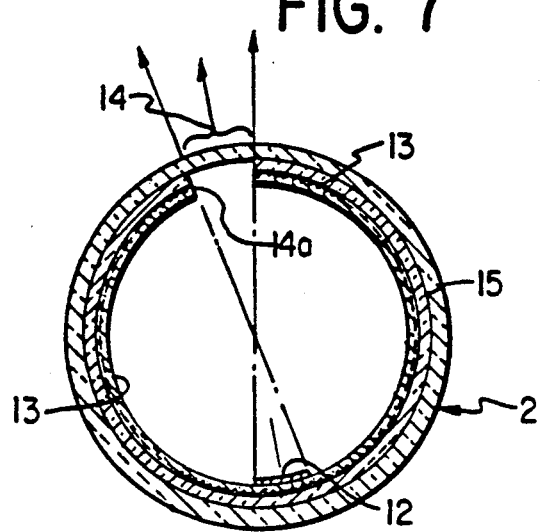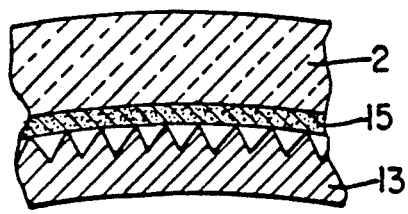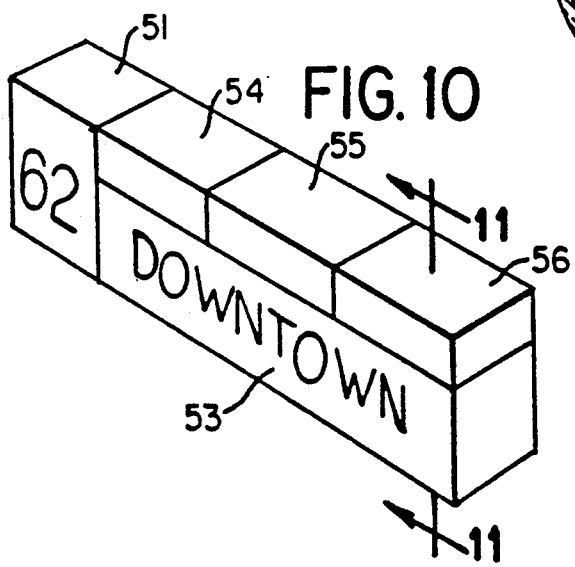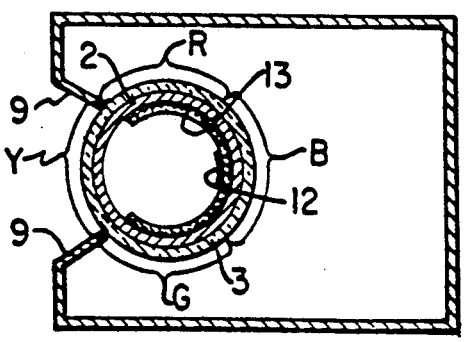

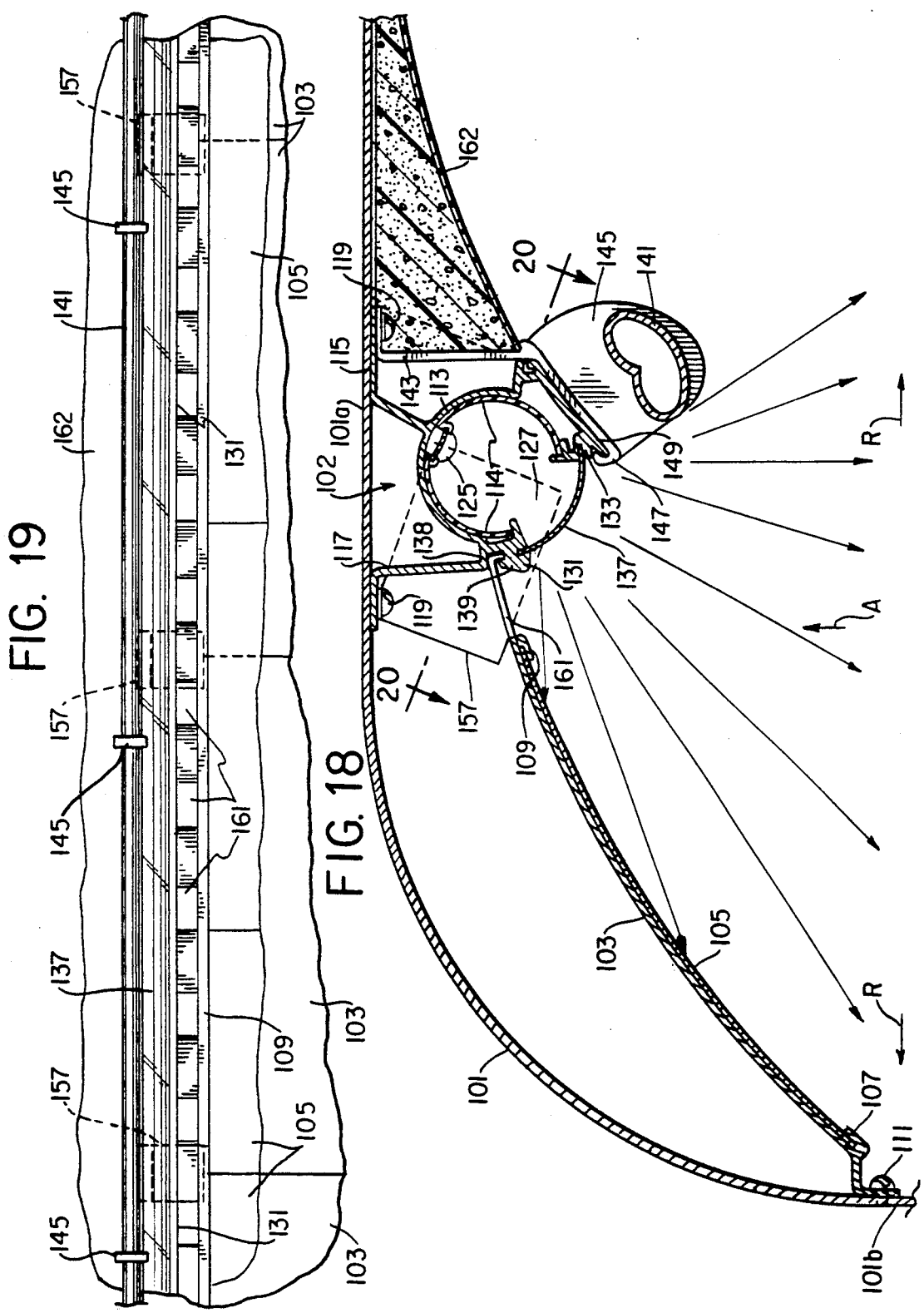

ILLUMINATING SYSTEM

The present application is a continuation-in-part of prior application Ser. No. 395,889 for Illuminating System, filed Aug. 18, 1989, now U.S. Pat. No. 5,016,143, issued May 14, 1991, which in turn is a continuation-in-part of prior application Ser. No. 255,062 for Multi-Color Illuminating System, filed Oct. 7, 1988, now U.S. Pat. No. 4,996,632 issued Feb. 26, 1991.

BACKGROUND OF THE INVENTION

The present invention relates to an illuminating system, particularly useful for route and destination signs, for illuminating displays, and for general illumination and advertising card illumination, such as for aircraft, buses or other vehicles.

Readability of signs or displays, such as those for route and destination indication on public motor vehicles, buses and trains, or instrument panels for aircraft, is affected by day and night conditions, such as glare and external light. Readability can be improved by increasing contrast, since the greater the contrast, the greater will be legibility. While illumination systems have been employed to improve readability, existing illumination systems do not provide a uniform or even distribution of light. Bright spots, darkened areas at the end of the sign or display, and a halo of light along the bottom of the display or sign may appear, depending upon the arrangement of the light source utilized for illumination.

An optical film designed to convert point sources of light into an evenly dispersed area of light has been developed under the trade name 3M Brand Scotchlamp Film, and is shown in U.S. Pat. No. 4,260,220. The film is made of transparent plastic in sheet form, which is smooth on one side and grooved on the other. Its thickness is about 20 mils (0.02 inch). The grooves are actually tiny optical prisms with fragile corners and delicate faces. The film is flexible, and may be readily rolled or bent. It may be called a transreflective material.

This film is used as a part of prism light guides which distribute sunlight received from a solar light tracking system to illuminate indoor office space evenly. In the February 1987 issue of the trade magazine Architectural Lighting, there was an article about this application which suggests illuminating decorative, attention-getting displays with such prism light guides. This article suggests that colored light could be provided by fitting a luminaire with colored PAR lamps. The light could be controlled in three ways: electronic dimmers and a small microprocessor; rotating filter wheels with different colored gels; or solenoid-operated dichroic filters in front of white light sources.

Further, the use of rotatable translucent multi-color tubes is known in which a light source is arranged directly inside the tube itself and portions of the color tube are shielded so that only a desired colored segment of the color tube is illuminated by the light source. An example of such a tube is disclosed in U.S. Pat. No. 2,374,640.

It is also common on buses or other mass transit vehicles to provide an elongated illumination device extending along the length of the vehicle adjacent each corner of the vehicle passenger compartment, with provision for mounting advertising cards adjacent to the light source, which is designed to provide illumination for the cards and also general reading illumination in the passenger compartment. An example of such arrangements is disclosed in U.S. Pat. Nos. 2,587,807; 3,035,161 and 4,387,415.

SUMMARY OF THE PRESENT INVENTION

It is an object of the present invention to improve the general illumination and readability of signs and panels, or of vehicle advertising cards, by illuminating them with evenly distributed light, which may be selectively colored, where desired.

It is also an object to provide an improved elongated light source, which may be selectively colored, where desired.

In keeping with this object, and others which will become apparent below, one aspect of the present invention resides in an arrangement for illuminating, comprising a source emitting light into a tube with a light-transmissive portion. The light source may be arranged outside of the tube so as to emit light into the tube through an open end, either directly or by way of a mirror. A high reflectance or transreflective film covers a portion of the inner surface of the tube and distributes light along the length of the tube, which has a longitudinal area through which light is transmissible. The film is preferably formed with optical prisms for multiply reflecting the light inside the tube.

A diffusing medium is arranged in the tube diametrically opposite the light-transmissive longitudinal area so that light striking the diffusing medium is scattered or diffused outwardly through the longitudinal light-transmissive area. A reflector may be placed at the opposite end of the tube from the light source to reflect light back into the tube.

It is an additional object to provide selective colored illumination, as by providing an additional outer tube having a plurality of transparent or translucent colored portions each of a different color and concentrically surrounding such a tube as described above. The outer tube is rotatable into a predetermined position by a motor drive to select a desired color for illumination. The outer tube is formed so that when in a predetermined position only one of its color portions is exposed to the light transmitted through the inner tube's light-transmissive longitudinal area.

It is a further object to provide an improved illumination, as by use of a lens in the light-transmissive longitudinal area.

It is another object to provide improved color illumination, as by use of one or more extensions on the outer tube adapted to receive color inserts or by use of color silkscreened on the outer tube.

It is still another object to provide an improved elongated light source having substantially uniform illumination along its length, and useful for general illumination and/or special purpose illumination, in mass transmit vehicles among other places.

For a better understanding of the present invention, reference is made to the following description and accompanying drawings while the scope of the invention will be pointed out in the appended claims.

BRIEF DESCRIPTION OF THE DRAWINGS

FIG. 6 is a schematic end elevation view of the arrangement of FIG. 4, in which light rays are represented by arrows.

FIG. 7 is a transverse sectional view of the light guide tube of FIG. 6 by itself.

FIG. 8 is an enlarged fragmentary view of a portion of the tube of FIG. 7.

FIG. 9 is a transverse sectional view of a light guide tube in accordance with a second embodiment of the invention.

FIG. 10 is a perspective view of a destination sign, for buses or the like, utilizing three selectable-color light tubes similar to those of FIGS. 1-8 and 9.

FIG. 11 is a transverse sectional view of FIG. 10 along line 11—11 thereof, showing one of the light guide tubes of FIG. 10.

FIG. 18 is a cross-sectional view of the corner area of a bus or other mass transit vehicle, on which is mounted an advertising card carrier and an elongated illuminating source according to the present invention.

FIG. 19 shows an upwardly directed plan view of the arrangement of FIG. 18 viewed along line 119 thereof.

DETAILED DESCRIPTION OF THE PREFERRED EMBODIMENT

Figure 4:
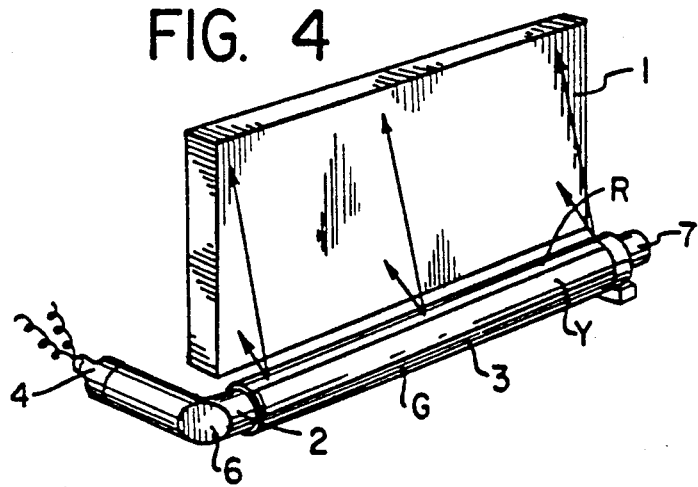
FIG. 4 is a schematic perspective view of a multi-color illumination arrangement in accordance with the present invention, in place for illuminating a sign.
Figure 5:
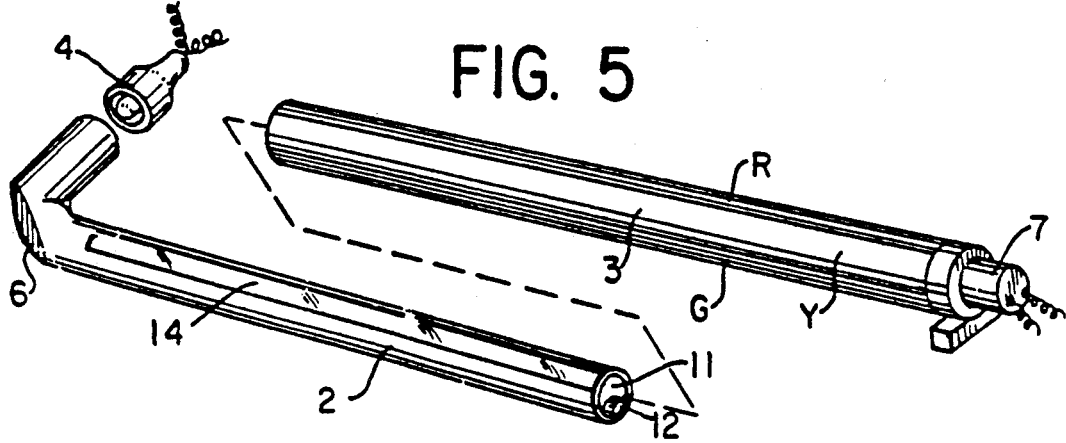
FIG. 5 is a schematic exploded perspective view of the arrangement of FIG. 4.

Referring now to FIGS. 4 to 6 of the drawings, a sign 1 is illuminated by evenly distributed colored light from a multi-colored illumination arrangement. This arrangement includes a light source 4 with reflector, an inner tube 2, an outer tube 3, reflectors 6, 11, a diffusing medium 12, a high reflectance light-distribution film 13, and a motor assembly 7.

The reflector 6 is angled to reflect light emanating from the light source 4 into the inner tube 2. The reflector 6 is preferably made of 3M SILVERLUX material or like reflecting material. The light then propagates inside the inner tube by reflecting off the high reflectance film or sheet 13, which is preferably 3M SCOTCHLAMP film or the like, whose properties are described below. Reflector 11 is arranged at the end of the inner tube 2 furthest from the light source 4 so as to reflect propagated light back into the inner tube 2. Reflector 11 may be of the same material as reflector 6.

Figure 3:
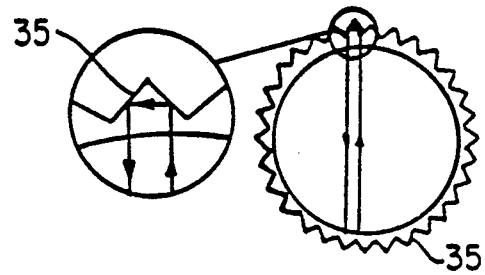
FIG. 3 is a schematic transverse view of FIG. 2, in which light rays are shown, to illustrate total internal reflection by prism faces, with the encircled portion shown also enlarged.

The diffusing medium 12, which may be a dull white (or other desired color) strip or coating to cause diffusion or scattering of the light impinging thereon, extends along the length of the inner tube 2 near the bottom, as seen in FIG. 3. The diffusing medium 12 is substantially diametrically opposite a longitudinally extending light-transmissive portion 14 (which may be an opening, not shown) in the wall of the inner tube 2, which registers with a gap 14A in the film 13. When the light strikes the diffusing medium 12, the light diffuses or scatters, with some passing through the light-transmissive portion 14. The rest is multiply reflected by film 13, ultimately striking diffusing medium 12 to pass through light-transmissive portion 14. The diffusing medium may be laid or coated on the inner surface of the film 13. Alternately, the film 13 and tube 2 may have a longitudinal slot or recess into which the diffusing medium is placed.

Figure 1:
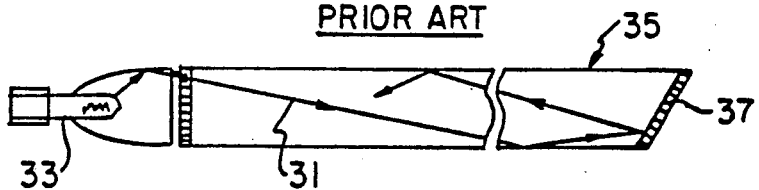
FIG. 1 is a schematic side longitudinal view of a light guide tube with light propagating through the tube from a light source, in accordance with the prior art.
Figure 2:
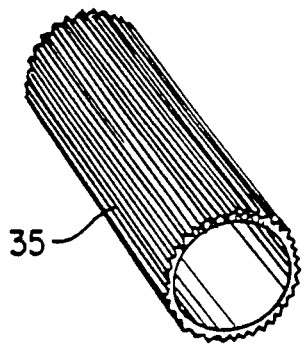
FIG. 2 is a schematic perspective view of the light guide tube of FIG. 1.

The high reflectance film 13 is a thin, flexible, clear transparent material, such as acrylic or polycarbonate polymer, with a smooth surface on one side and prismatic grooves on the other side, which form on the surface of inner tube 2 tiny optical prisms that extend longitudinally along tube 2. The properties of such a film are illustrated in FIG. 1, which schematically shows a light guide tube 35 and an external light source 33 with a reflector surrounding it. The light guide tube 35 is formed of Scotchlamp material, having a transparent wall with a grooved outer surface forming prismatic elements, which are efficient total internal reflection surfaces and prevent light which is travelling down the guide tube from escaping through the film 13. Each prismatic element has two prism faces inclining outward towards each other and into contact with each other so as to have a V-like shape. These are more clearly shown in FIGS. 2 and 3.

Referring again to FIG. 1, it can be seen that a light ray 31, emitted from the external light source 33, strikes the interior of the transparent wall of guide tube 35, through which the light refracts in accordance with Snell's law to pass through the body of the transparent wall.

If the ray strikes one prism face at any angle less than the critical angle for total internal reflection, it reflects by total internal reflection and heads for the other prism face of the same prismatic element. If reflected by total internal reflection again, it returns to the interior of the tube for further propagation. A ray will be reflected if the angle it makes with the tube axis is less than about 27 degrees. The exact angular value is dependent upon the refractive index of the transparent material.

The film 13 is formed to reflect the light and to minimize absorption and transmission. Absorption per bounce for a typical ray has been found to be as low as a 0.12% and residual transmission losses may be about 1.2% for typical angles of incidence. Reflectance is thus about 98.7%.

Upon reaching the end of the tube 35 which is furthest from the light source 33, the light ray is reflected by a reflector 37 back into the guide tube 35.

In order to avoid even residual transmission losses, a white surface 15 may be added between the inner tube 2 and the high reflectance film 13 as shown in FIG. 7. Thus, light which may be transmitted through the film 13, which would otherwise constitute a residual transmission loss, is diffused or reflected back into the inner tube from the white surface 15 and is thereby retained to enhance efficiency.

Referring again to FIGS. 4 to 7, the outer tube 3 concentrically surrounds the inner tube 2. A motor assembly 7 is used to rotatably position the outer tube 3 relative to the inner tube 2 in any conventional manner. The outer tube 3 is formed of a number of longitudinal light-transmissive (transparent or translucent) colored filter sections (as seen in FIG. 6), any one section being positionable to be opposite the light-transmissive portion 14. The color filter segments of the outer tube 3 may be in the form of either transparent color inserts suitably held to the outer tube, as by projecting lips, or transparent color silk-screened onto the segments of the tube 3. Preferably, the outer tube 3 is divided into color quadrants, each quadrant having a different color such as green G, red R, yellow Y, and blue or black B, each of which extends along substantially the full length of the outer tube 3. In this way the light then projects outwardly from the entire length of the sign 1 to effect illumination of the sign 1 with a single colored light.

Figure 12:
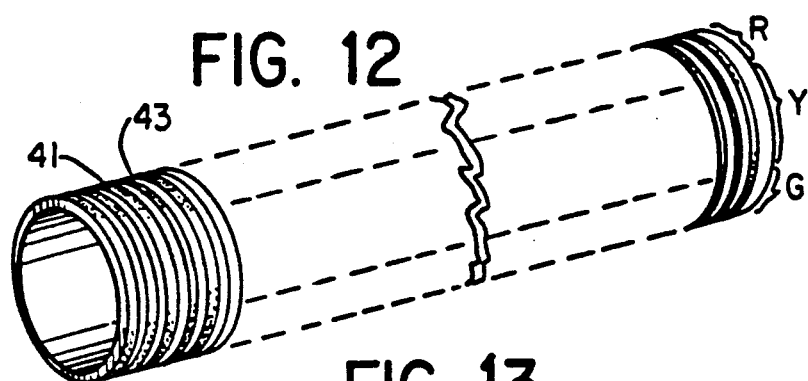
FIG. 12 is a perspective view of a multiple-color outer tube useful in the preceding embodiments.
Figure 13:
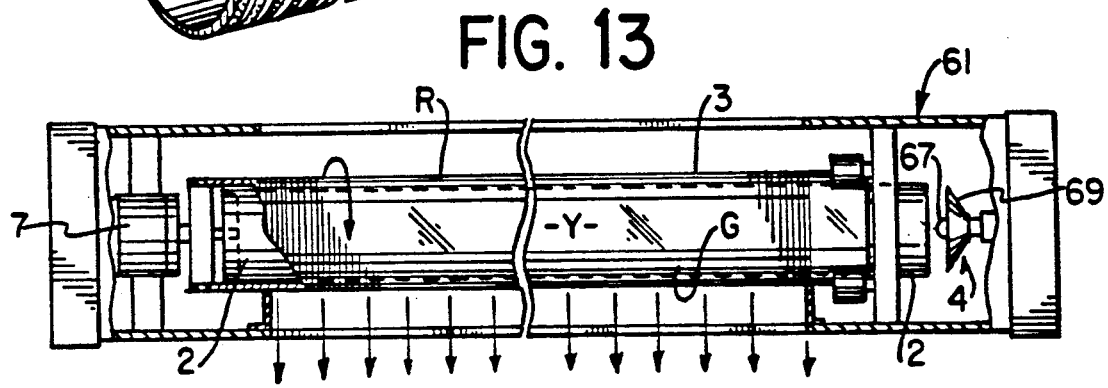
FIG. 13 is a longitudinal view partly in section of a multi-color extended light source useful in preceding embodiments.

When used in a bus sign, for example, the colored light transmitted by the colored filter sections R, Y, G, B may not be highly visible in daylight, and such colored light-transmitting filter sections are usually poor light reflectors, leading to poor daylight visibility. This may be overcome by making each color-transmitting section partially efficiently light-transmissive and partially efficiently light-reflective. For example, as shown in FIG. 12, each section R, Y, G or B may be formed of alternate stripes 41 of color-filter material (shown stippled) and intervening stripes 43 of color-reflecting material. In each quadrant, the color-filtering and color-reflecting materials are preferably chosen to have closely similar color as perceived either in daylight or night-time.

If desired, a controller or a computer may be used to control the positioning of the outer tube 3 so that a desired color segment R, Y, G, or B will be exposed, either to filter the light passing through the light-transmissive portion of the inner tube 2 or to be reflected by ambient light.

The light source 4 does not necessarily have to be arranged perpendicular to the axis of the inner tube 2. Any angular orientation can be used if accompanied by an appropriate position of the reflector 6 to reflect the light nearly axially into the inner tube 2. If the light source 4 and the inner tube 2 are substantially co-linearly arranged, no reflector 6 is needed. A reflector may be used surrounding the light source or bulb, to focus the light rays to be substantially axial of or slightly converging along the tube, as indicated schematically in FIG. 6. However, a perpendicular orientation for the light source axis is preferred to obtain better accessibility to the light source bulb for replacement purposes, and to reduce the axial dimensions of the system. This is advantageous when the sign to be illuminated is on a bus, since there may be insufficient space available at the side of the sign for gaining access to the bulb and effecting removal and replacement when needed.

FIG. 7 shows a schematic sectional view of the inner tube alone, depicting the path of certain light rays. Essentially the only light emitted to the exterior is through the light-transmissive portion 14, derived from the diffusing medium 12. The film 13 on the inner surface of tube 2 between diffusing medium 12 and the light-transmissive portion 14 serves primarily to distribute the light uniformly along the length of the tube 2, without directly passing through the light-transmissive portion 14. After multiple reflections, the light ultimately hits the diffusing medium 12. Those rays from diffusing medium 12 which do not exit from the light-transmissive portion 14 are internally reflected and multiply, with little loss, to impinge again on diffusing medium 12. Thus, ultimately nearly all the light energy is emitted through the light-transmissive portion 14, with very little loss.

FIG. 9 shows a view similar to FIG. 7 for a second embodiment. In FIG. 9, an opaque tube 2A, which may be an aluminum or plastic extrusion or pultrusion, is used in the same way as inner tube 2. The opaque inner tube 2A also has a portion lined with the high reflectance film 13 except for an unlined portion or gap in the form of a longitudinal slit in which is placed a lens 8 which longitudinally extends along a length of the tube 2A. In order to avoid residual transmissive losses through the film 13, the inner surface of the tube 2A is made white or reflective so that light transmitting through the film diffuses or reflects back into the tube 2A and is thereby retained.

The lens 8 may be designed in known manner to provide a more uniform illumination from the bottom to the top of a sign 1 (see FIG. 6) and to adjust for the shorter path length for light rays impinging on the lower portion of the sign 1. The lens 8 may be linear, prismatic, clear and illustratively is composed of polycarbonate material.

A diffusing medium 5 is also arranged diametrically opposite the lens 8 and, for improved uniformity of light distribution along the tube length, may be of a varying width. The diffusing medium 5 widens as it extends longitudinally away from the light source 4 in the embodiment of FIG. 5. As one example, the diffusing medium may have a width 5A of 0.43 inches nearest the light source, a width 5B of 0.58 inches about midway along the length of the inner tube 2, and a width 5C of 0.88 inches furthest from the light source 4 or nearest the end reflector 6. This varying width may be provided by bulging the diffusing material to provide a varying curved-surface width along the length of tube 2A. This may be provided, for example, by forming a uniform width groove or slot in the tube 2A, with edges to retain a strip of diffusing material of gradually varying width, providing gradually varying bulging of the strip along its length. This varying width aids in providing uniformity of illumination along the length of the light tube 2 by compensating for a tendency for a greater amount of light to pass through the light-transmissive portion 14 nearer the source than at the remote end of tube 2A.

Also, the lens 8, which is preferable of a unitary one-piece construction, may have two or more transverse sections 8A and 8B. Such sections are useful to project the diffused light rays on either side of the centerline 16 of FIG. 9 to effect more uniform illumination over a sign such as sign 1. Each lens section 8A, 8B has a sloping surface relative to the centerline 16 so as to refract the light which is emitted from the curved surface of the diffusing medium 5, to distribute the light more uniformly over sign 1.

Further, since the light has further to travel to reach the top of an object or sign to be illuminated than to the bottom, the angle of refraction of the light leaving the various lens sections may be different. One way to achieve a different angle of refraction with the same lens material is by having one section formed thicker than the other as shown in FIG. 9. Another way would be to obtain a different angle of refraction by using lens sections of different material. Thus, each lens section may actually be a separate lens with its own refractive index different from that of the other.

The light source 4 is preferably an incandescent halogen lamp which has advantages over a fluorescent lamp. For example where lower wattage is desired, one 20 watt incandescent halogen lamp can replace two 20 watt fluorescent lamps while providing an improved lighting effect. Such halogen lamps provide higher intensities, with a narrower beam, more uniform brightness (top to bottom of sign), easy relamping through the back, lower cost and fewer components (socket and lamp versus two lamps, two sockets, a ballast and wiring channel), and require less input power (e.g. 20 watts versus 43 watts). In addition, such lamps produce ultraviolet light which can be made to interact with fluorescent material on the illuminated surface to give enhanced brightness or special effects.

Further, the showing of darkened letters at each end of the sign or of a halo of light along the bottom of the sign is inhibited by the use of the present invention with halogen lamps. Where the electronic sign employs yellow dots or disks for the lettering, these dots or disks remain yellow in appearance in light from the halogen lamp rather than appearing yellow-green as would be common with light from fluorescent lamps. These advantages override a disadvantage of the halogen lamp, namely, that the halogen lamp has a life which is less than that of fluorescent lamps.

In order to facilitate accessability, tube 2 or 2A may be split longitudinally and at the diffusing medium 5, and thus formed in two nearly half-cylinder sections. The two halves may be joined, together with the lens 8 and diffusing medium 5, by an end ring or cylinder, which for example may carry a gear to be driven by the motor drive assembly.

Instead of illuminating an essentially vertical surface, as shown in FIG. 4, the illumination arrangement of the present invention may be used to provide forward-facing selectable-color light bars. Multiple multi-color illumination arrangements of the invention may also be arranged end to end, as seen in FIG. 10. That figure illustrates use of the present invention in a bus destination sign display, having a section 51 displaying a bus route number, a section 53 displaying a bus destination (e.g., "DOWNTOWN") and three sections 54, 55, 56, each of which is a structure as described above which displays an elongated bar of a selectable color R, Y, G, B. Thus 3-color codes, up to 64 in number, may be displayed, which would be intelligible at a greater distance than letters or numbers may be legible. Obviously as many sections like 54, 55, 56 may be used as desired, to afford a greater variety of codes. In this arrangement it may be desirable to have the inner tubes communicate with each other at their adjacent ends, which are then left open, with a single light source at one end or a light source at each end. The motor drive assemblies for such arrangements are then arranged to act on the respective outer tubes but not to interfere with light communication between the inner tubes. Alternatively, each segment may be an independent unit, with its own light source and motor drive.

As shown in this figure, the light emitted from the light guide may be enhanced and its distribution improved by use of image enhancer plates which of course may be used with any of the forms of light guide of the present invention. In FIG. 11, image enhancer plates 9 are shown on either side of the gap 14A, inclining inward from a housing assembly 10 towards the outer tube 3. These plates 9 are light-reflective and increase the apparent size of a colored segment of the color tube 3. These image enhancer plates 9 ideally extend longitudinally along the entire length of the outer tube 3 and may further extend transversely at the ends of the outer tube so as to incline outward along the entire periphery of the outer tube's color segment which is exposed to light from the inner tube 2 or 2A.

In an alternate embodiment, the image enhancer plates 9 may incline outward from adjacent the periphery of the light-transmissive portion of the inner tube 2 or 2A. Such arrangements may also be used to enhance the light passing through the light-transmissible portion when no color-creating outer tube 3 is employed.

The image enhancer plates 9 help to uniformly distribute and enhance the illuminating effect of the light transmitting through the light-transmissible portion by reflecting light which would not have been directed at the object or sign to be illuminated and thus would have been lost. The enhancer plates thereby capture this otherwise lost light.

An observer looking head-on at the colored segment of the outer tube and the enhancer plates 9 (from the left in FIG. 6) will get an impression of a full rectangle of color, the size of the outer periphery of the plates. Tis impression is most pronounced when the image enhancer plates have a substantially parabolic curvature, although flat plates are a decided advantage. It can be readily understood that the surfaces of such enhancer plates may be formed curved, as desired, to illuminate the sign or object uniformly throughout. Thus, in the usage of FIG. 4 or 6, their surfaces may be formed to reflect more light on the area of the sign 1 furthest away from the tubes 2,3 so that the entire sign would appear to be illuminated by the same intensity of light.

Figure 14:
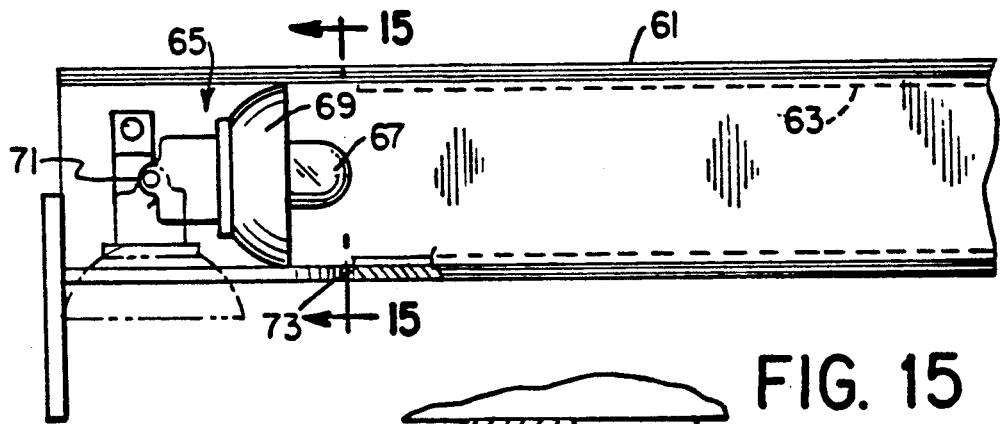
FIG. 14 is a partial longitudinal section of an extended light source utilizing the principles of the invention.
Figure 15:
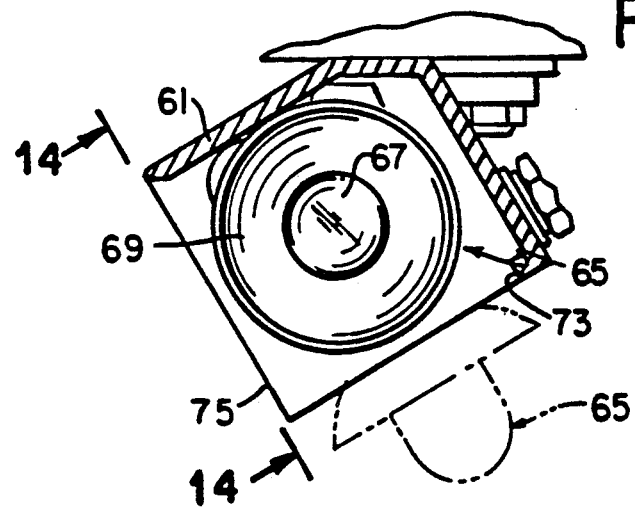
FIG. 15 is a cross-sectional view of FIG. 14 viewed along line 14—14 thereof.

FIGS. 14-15 show an improved arrangement where color 15 change is not needed. Here the housing 61 contains a stationary light guide arrangement 63 whose construction may be that of FIG. 7 or FIG. 9 without the outer tue or its drive. A light source assembly 65 is located at each end, comprising a light bulb 67 and reflector 69 for directing light along light guide 63. The assembly 65 is pivoted at 71 so that it may be extended beyond housing 61 through an opening 73, as seen in dashed line in FIG. 15, to permit easy replacement of bulb 67 when needed. Conventional latching means (not shown) usually retain each source 65 in operative position as shown in FIG. 14. Housing 61 is open along one side 75. Thus, an extended generally uniform illumination is provided, of any desired length, determined by the length of light guide arrangement 63.

Figure 16:
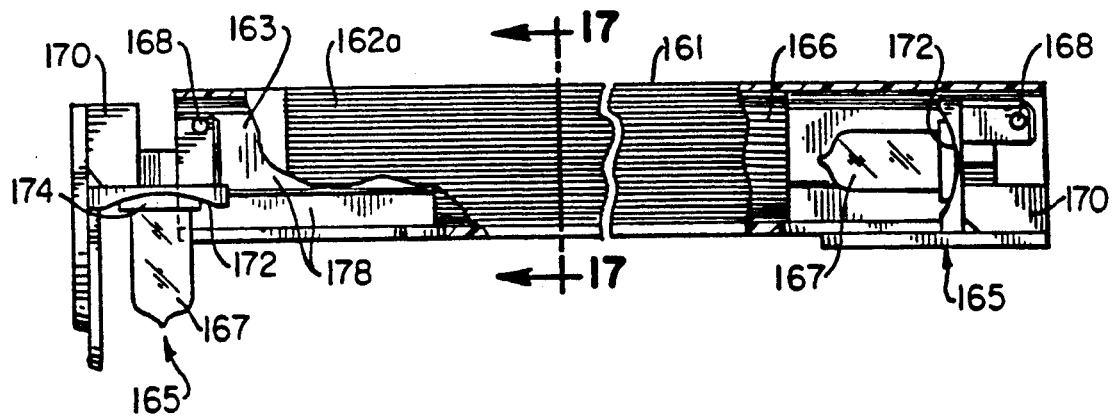
FIG. 16 is a longitudinal view, partly broken away, of a modification of the device of FIG. 14.
Figure 17:
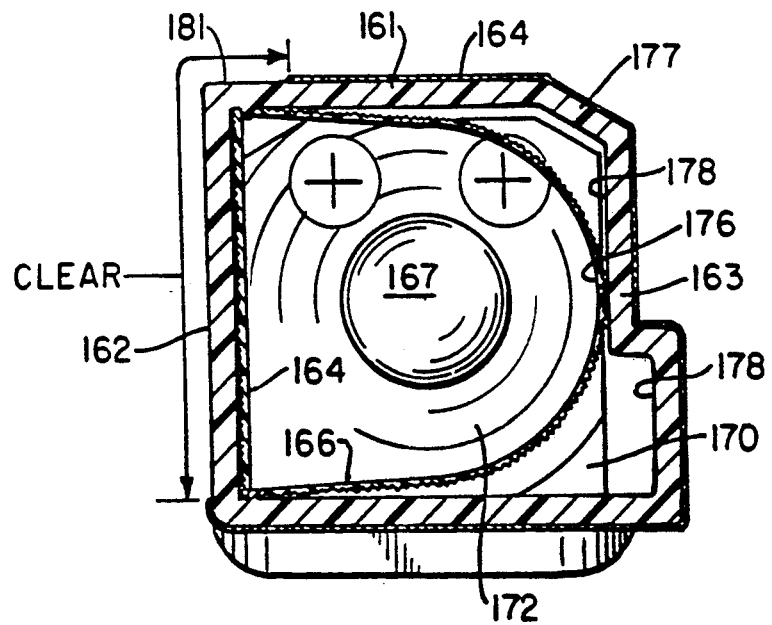
FIG. 17 is a cross-sectional view of the device of FIG. 16, viewed along line 17—17 thereof.

FIGS. 16 and 17 show a modified arrangement of the arrangement of FIGS. 14 and 15. The housing 161 is formed of a clear transparent plastic having a light-transmitting face 162 and a back portion 163 where the clear transparent plastic is covered by an opaque coating, such as of black lacquer 164a. Juxtaposed on the inner side of the clear housing face 162 is a flat plate or sheet 164 formed on the same transreflective material as the light guide arrangement described above with respect to FIG. 3. Also substantially lining the inner side of the opaque portion 163 of housing 163 is a curved sheet 166 of the same transreflective light guide material. Flat sheet 164 and curved sheet 166 together formed cylindrical light guide arrangement as above, but of non-circular cross section.

At each end of the housing 163 is a light assembly 165. Each light assembly 165 is pivoted at 168 to the housing 163 so that, as shown in the left portion of FIG. 16, the light assembly 165 may be pivoted by 90° to make the light bulb 167 accessible for replacement purposes. The light assembly 165 is formed of a support 170 carrying a curved reflector 172 which may be of parabolic shape. At the center of reflector 172 is a lamp socket (indicated generally at 174) into which a light bulb 167 may be plugged. The light bulb socket 174 has contacts (not shown) which engage the terminals of the light bulb 166 and are connected to terminals 165 for electrical connection to a suitable source of electrical power. By this arrangement the light bulb 167 extends generally axially of the housing 163 with its reflector 172 behind it, when the assembly is in the operative position shown at the right side of FIG. 16. The light bulb 167 therefore projects its light along the interior of the housing longitudinally of the cylindrical light guide formed by 164,166.

The properties of the light guide are as described above, so that light rays impinging at a shallow angle on the interior of the light guide are reflected inwardly. Those rays that travel the length of the housing 163 will then be reflected by the reflector 172 at the opposite end. Accordingly, the light rays travel back and forth within the light guide. Certain of the rays impinging on the sheets 164, 166 may be refracted by the material of the light guide and exit from the light guide. To preserve efficiency, the interior 178 of the housing 163 which surrounds the curved light guide sheet 166 is coated or painted white, so that any light which may exit from the light guide is in turn reflected or diffracted back into the light guide. Alternatively, the transparent housing may be coated white on its exterior, beneath any black or opaque outer coating.

As in the case of preceding figures, a central portion of the curved light guide sheet 166 may (but need not) have a diffusing strip 176 extending along its length diametrically opposite from the clear face 162 of the housing 161.

Also, as shown in FIG. 16, the flat sheet 164 preferably has a length greater than that of the curved sheet 166 so that the curved light guide sheet 166 covers only the central part of the length of the housing 161. Thus the curved sheet 166 backs up only a portion of the flat sheet 164, leaving end portions 162A of the flat sheet 162 unbacked by the curved sheet 166, but backed by the white surface 178 of the interior of the housing 161. As a result, the white sections 178 at each end of the housing serve as diffusing and reflecting areas from which light rays are directed nearly perpendicularly or at other angles to sheet 164. These light rays may pass through sheet 164 and provide illumination.

In addition, as seen in FIG. 16, the flat or front face 162 of the housing may extend to a region 181 at the top edge of the housing 163 at an angle to the front face. Therefore, particularly in the regions to which the curved light guide sheet 166 does not extend, light rays may exit directly through the clear area 181 of the housing 161 for further regulation of the distribution of the light emitted from this arrangement.

The housing 161 may have a flattened corner shown at 177, which forms a surface for mounting the housing under a shelf or light shield. The clear region 181 thus illuminate generally forwardly while the front face 162 would illuminate generally at a downward angle, and provides a diffused light source essentially without glare. This is particularly useful for illuminating instrument panels of an aircraft, beneath a glare shield under which the arrangement may be mounted. It will be understood that sheet 164 and areas 178 may be suitably colored if desired.

It will be understood that, where color change is not needed in any of the foregoing forms of the invention, a stationary single-color outer tube may be used in place of the rotatable outer tube, or the outer tube may be dispensed with entirely. In the latter case, the diffusing strip 12 may be appropriately colored, when desired to provide a non-white illumination, such as for photographic dark rooms or night illumination of instrument panels.

Where desired, an extended-length source of infra-red or ultra-violet light may be provided by the present arrangement by placing an appropriate infra-red or ultra-violet filter between light source 4 or 65 and the light guide, or otherwise inputting only infra-red or ultra-violet light to the light guide.

FIGS. 18–22 show applications of the invention to use in a bus or other mass transit vehicle for both general illumination and for illuminating advertising cards. FIG. 18 shows a cross-section of the corner area of a bus having an inner skin or lining 101 (which may be made of plastic, e.g. by pultrusion, or of sheet metal) curving from the ceiling 101a to the side wall 101b of a bus. FIG. 19 shows a small scale, partially broken away, upwardly looking plan view of the devices of FIG. 18, viewed in direction A of FIG. 18, to show a series of several light fixtures along the length of the passenger compartment. Extending along the length of the passenger compartment of the bus is a series of lighting fixtures 102, each having a panel 103 for supporting an advertising card 105 between a lower groove formed on the panel 103 by a lip 107 and an upper groove formed by a similar lip 109. The panel is shown as connected to the side wall 101b of the bus by a suitable flange or bracket arrangement 111 at its lower edge. At its upper edge the card carrying panel 103 is illustratively supported from a light tube 113 similar to that of FIG. 7 or 9. The light tube 113 is illustratively shown as formed as an extrusion (for example from aluminum or plastic resin) or a pultrusion of fiberglass).

Formed as part of the light tube 113 is a first bracket 115 and a second bracket 117, extending along tube 113. Each bracket is secured by suitable means (illustrated as screws 119) from the ceiling 101a of the vehicle. Bracket 115 may be omitted, relying upon bracket 143 and bracket 117 to support the light tube 113. Light tube 113 preferably has a varying width diffusion member 125 corresponding to element 5 of FIG. 9, opposite a longitudinally extending opening 127. The light tube is formed with a pair of grooves 131, 133 within which is retained a light transmissive strip 137 which may be of clear plastic, or translucent plastic serving as a light diffuser or, formed as a fresnel-type lens for distributing the light emitted from the light tube over both the reading area of the bus, between the arrows RR and also on the advertising card 105. The light tube member 113 is also formed with a groove 138 which engages a small flange 139 at the upper edge of the card carrier panel 103. This flange is also shown more clearly in FIG. 22 and is described more in detail below.

The light tube 113 also provides an arrangement for helping support a hand rail 141 by means of a bracket 143 having a rail supporting section 145. The bracket 143 has a groove 147 at one edge engaging an extension 149 formed on the tube 113. Tube 113 contains two strips of trans-reflective material 114 except the opening 127 and at the position of the diffusing element 12, to form the interior light-reflecting arrangement described above.

It will be understood that the brackets 143 are spaced along the length of the vehicle passenger compartment by appropriate distances, as may be desired for proper structural strength. Any other desired means for supporting the hand rail may be used. The light tube holder 113 is formed in appropriate sections such as 4, 6, or 8 feet in length, to conform to the lighting requirements of the vehicle passenger compartment.

Figure 21:
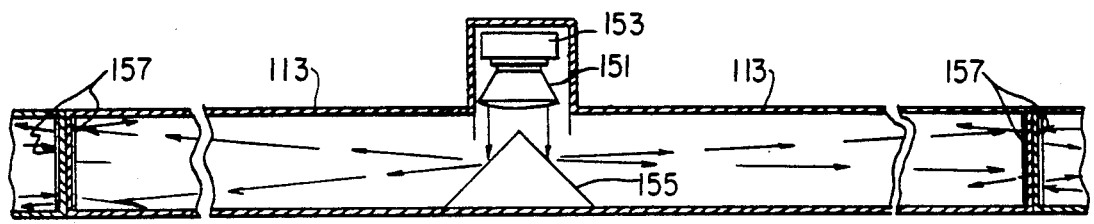
FIG. 21 is a similar diagrammatic longitudinal cross-sectional view of a modification of the arrangement of FIG. 20.
Figure 20:
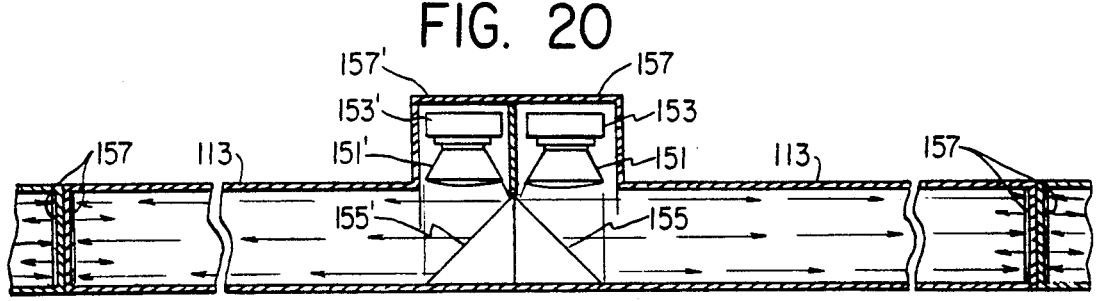
FIG. 20 is a diagrammatic cross-sectional view of the structure of FIGS. 18 and 19 viewed along line 20—20 thereof.
Figure 22:
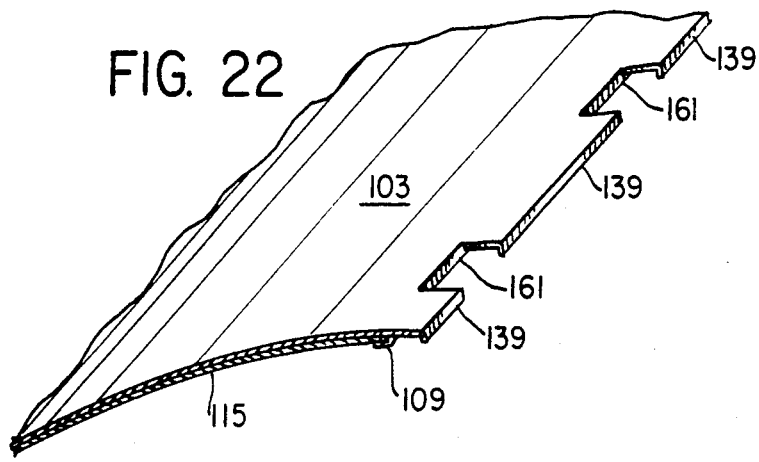
FIG. 22 shows a fragmentary prospective view of one form of the card carrying panel of FIGS. 18-21, accommodating ventilating openings.

FIG. 21 illustrates how light may be supplied to each light tube section, in a manner similar to FIG. 4 or 6. At one end of a light tube 113 is a light housing 157. A lamp 153 in light housing 157 is supported in a socket arrangement 151 and projects light to a 45-degree prism or mirror 155, which changes the direction of light from the lamp 153 to be substantially axial along the light tube 113. Lamp 153 may be a high-intensity halogen lamp (e.g., 20 to 40 watts) with a reflector associated with it. As indicated above, a mirror 157 may be placed at the far end of the light tube 113 from the light source 153. Alternatively, a second and similar light housing may be placed at the far end of the tube 113. As shown in FIG. 20 preferably two light sources 153 and 153' in respective housings 157 and 157' (or a single joint housing) are placed at the same location. Thus, if the light tubes are, for example, six feet in length, the light sources would be placed approximately every twelve feet, at locations convenient for maintenance purposes.

The web of bracket 117 in conjunction with the ceiling lining 101 and the card carrier panel 103 define a duct which may be used for the distribution of fresh or heated or cooled conditioned air, as desired. To provide for the distribution of air to the passengers seated below the light tube 113, openings 161 are provided in the card carrier panel 103 as shown more clearly in FIG. 22. These openings are distributed in accordance with the requirements for ventilation and passenger comfort in the passenger compartment of the vehicle.

To enhance the appearance of the passenger compartment, a curved panel 162 may extend from the light tube 113 in an arc across the center of the ceiling of the vehicle, to a similar light tube 113 (of mirror image confirmation in relation to that shown in FIG. 18). The space between the panel 161 and the ceiling lining 101a may be filled with insulating material or used for accommodating wires for the vehicle electrical system, including the lighting fixtures described below.

While tube 113 and panel 103 have been described illustratively as made from separate extrusions or pultrusions, a single composite extrusion or pultrusion having the desired profile may be used where expedient.

It will be understood that in the form of the invention shown in FIGS. 18-21, each section of light tube 113 may be provided with a light source as shown, at either or both ends. In addition, the form of light source shown in FIG. 16 may be used in place of those in FIGS. 18-22, with each light source suitably mounted as shown in FIG. 16, for ready lamp replacement when needed.

While the foregoing description and drawings represent the preferred embodiments of the present invention, it will be understood that various changes and modifications may be made without departing from the spirit and scope of the present invention as defined by the appended claims.

What is claimed is:

1. A lighting fixture for a mass transit vehicle having an elongated passenger compartment adapted to contain a series of lighting fixtures arranged end-to-end in said compartment, said fixture comprising:
   a. a panel having a substantially uniform cross-section with a concave profile adapted to hold an advertising card, one edge of said panel being adapted to be secured to an inner substantially vertical wall of said compartment; and
   b. illuminating means for illuminating said card and providing general illumination in said compartment,
   said illuminating means comprising:
      (i) an elongated longitudinally extending tubular member arranged adjacent and parallel to a second edge of said panel,
      (ii) said tubular member having a light-transmissible portion extending longitudinally of said tubular member, said light transmissible portion partially facing and adapted to pass light toward said panel to illuminate a card on the panel,
      (iii) said tubular member also having a reflective inner surface for propagating light along the axis of the tubular member,
      (iv) a light source arranged so as to expose the interior of said tubular member to light from said light source for reflection by said tubular member inner surface, and
      (v) a diffusing medium arranged in said tubular member substantially diametrically opposite said light-transmissible portion to diffuse light striking said diffusing medium both directly and by reflection from said reflective inner surface, whereby light from the diffusing medium passes through said light-transmissible portion and is adapted to illuminate said panel.

2. An arrangement as in claim 1 further comprising a reflector at an end of said tubular member for reflecting light striking said reflector back into the interior of said tubular member, whereby the light exiting said light-transmissible portion is distributed over the length of said tubular member.

3. The arrangement as defined in claim 1, wherein said inner surface comprises a transparent sheet having longitudinally extending prisms formed therein.

4. The arrangement as defined in claim 3, wherein said tubular member has a surface facing said transparent sheet which is formed to return light transmitted through said sheet back into said interior of said tubular member.

5. The arrangement as defined in claim 1, wherein said light source projects light at an angle to said tubular member, and further comprising:
   a reflector arranged between said light source and said elongated tubular member, said reflector being arranged to reflect the light from said light source into and substantially along said tubular member.

6. The arrangement as defined in claim 1, wherein said light-transmissible portion is formed as a longitudinal opening in said elongated tubular member.

7. The arrangement as in claim 6 further including a light-transmissible element extending across said opening.

8. An arrangement as in claim 6 further comprising a lens arrangement in said opening for distributing light over a predetermined region.

9. The arrangement as defined in claim 8, wherein said lens has a plurality of sections of different thicknesses for selectively spreading light over different regions.

10. The arrangement as in claim 9 wherein said lens is of the Fresnel type having longitudinal prismatic elements.

11. The arrangement as defined in claim 9, having two said lens sections, wherein said lens sections are arranged so that an imaginary plane separates said sections, each of said sections being formed with a surface sloping away from said imaginary plane at a respective angle.

12. The arrangement as defined in claim 8, wherein said lens is linear, prismatic, and clear.

13. The arrangement as in claim 6 further comprising an elongated translucent element covering said opening.

14. The arrangement as defined in claim 1, wherein said diffusing medium is formed to pass scattered light through the light-transmissible portion with substantially uniform intensity along said elongated tubular member.

15. The arrangement as defined in claim 14, wherein said diffusing medium has a varying width, which width increases progressively away from the point of entry of said light in said tubular member so as to assist in uniformly illuminating along the length of said tubular member.

16. The arrangement as defined in claim 1, wherein said diffusing medium has a curved surface projecting convexly inwardly of said tubular member, said curved surface having varying arcuate width along the length of said diffusing source.

17. An arrangement as in claim 1 further including a second light source arranged to emit light into said elongated tubular member at the end thereof opposite said first light 18. An arrangement as in claim 1 or 17, wherein each of said light sources is pivotally mounted to permit rotation thereof through substantially 90 degrees whereby said light sources may be readily replaced.

19. An arrangement as in claim 1, wherein:
said panel has a first card-retaining structure adjacent said first panel edge and a second card-retaining structure spaced from said second panel edge, by a longitudinally extending panel area,
said panel having a series of openings along its length;
whereby upon utilizing said panel as a wall of an air duct above said panel, air flow in said duct may be distributed through said panel into and along said passenger compartment.

20. A lighting fixture for a mass transit vehicle having an elongated passenger compartment adapted to contain a series of lighting fixtures arranged end-to-end in said compartment, said fixture comprising:
a panel having a substantially uniform cross-section with a concave profile adapted to hold an advertising card, one edge of said panel being adapted to be secured to an inner substantially vertical wall of said compartment,
said panel having a first card-retaining structure adjacent said one panel edge and a second card-retaining structure spaced from a second edge of said panel by a longitudinally extending panel area,
an elongated longitudinally extending lighting arrangement arranged adjacent and parallel to said second edge of said panel and adapted to illuminate said card when on said panel,
said panel having a series of openings along its length, in said area between said second card-retaining structure and said illuminating means,
whereby upon utilizing said panel as a wall of an air duct above said panel, air flow in said duct may be distributed through said panel into and along said passenger compartment.

21. An elongated illuminating arrangement comprising
an elongated tubular member having a hollow interior,
said tubular member having a transreflective lining for conveying light within and substantially along the axis of the tubular member,
a light reflecting and diffusing surface between said lining and the wall of said tubular member,
a lamp socket at each end of said tubular member adapted to hold a light bulb substantially axially of said tubular member, and
a light reflector surrounding each socket and adapted to reflect light along said tubular member.

22. An arrangement as in claim 21 wherein a portion of the wall of said tubular member is light-transmissible.

23. A method for illuminating an advertising card in a cornice of a mass transit vehicle passenger compartment, comprising the steps of:
exposing to light the interior of an elongated tubular member which has a reflective inner surface extending along said tubular member;
propagating the light within the interior of the tubular member by reflecting the light from said reflective surface of the tubular member;
providing a diffusing medium in a portion of the tubular member and extending along the length of the tubular member to diffuse and scatter said reflected light impinging thereon; and
directing the diffused and scattered light from said medium transversely outwardly of said tubular member through a light-transmissible section extending longitudinally of said tubular member and facing said card.

24. A method as in claim 23:
wherein said diffusing medium extends partially around the inner periphery of the tubular member to diffuse and scatter said reflected light impinging thereon; and
directing the diffused and scattered light from said medium transversely outwardly of said tubular member along a substantial part of the length of said tubular member.

25. A lighting arrangement for a passenger compartment of a mass transmit vehicle comprising:
a series of elongated longitudinally extending tubular members, arranged end-to-end along said compartment,
each tubular member having a reflective inner surface for propagating light along the axis of the tubular member, and having a light transmissible wall portion extending longitudinally of the tubular member, each adjoining pair of tubular members having a single light source external thereof and adapted to project light into said pair of tubular members, further comprising:

a diffusing medium arranged in each said tubular member substantially diametrically opposite said light-transmissible wall portion to diffuse light striking said diffusing medium both directly and by reflection from said reflective inner surface, whereby light from the diffusing medium passes through said light-transmissible wall portion for illumination within said compartment.

26. A lighting arrangement comprising:

a pair of elongated longitudinally extending tubular members, arranged end-to-end, each tubular member having a reflective inner surface for propagating light along the axis of the tubular member, and having a light transmissible wall portion extending longitudinally of the tubular member, and a light source external to said adjoining pair of tubular members and adapted to project light into said pair of tubular members in opposite directions further comprising:

a diffusing medium arranged in each tubular member substantially diametrically opposite said light-transmissible wall portion to diffuse light striking said diffusing medium both directly and by reflection from said reflective inner surface, whereby light from the diffusing medium passes through said light-transmissible wall portion for illumination external of said tubular members.

* * * * *